Fig. 5

Aug. 4, 1970 — W. T. WILBUR — 3,523,172
WELDING APPARATUS
Filed Dec. 19, 1966 — 8 Sheets-Sheet 6

INVENTOR.
WILLIAM T. WILBUR
BY
Barnes, Kisselle, Raisch & Choate
ATTORNEYS

Aug. 4, 1970  W. T. WILBUR  3,523,172

WELDING APPARATUS

Filed Dec. 19, 1966  8 Sheets-Sheet 7

INVENTOR.
WILLIAM T. WILBUR
BY
Barnes, Kisselle, Raisch & Choate
ATTORNEYS

FIG. 16

INVENTOR.
WILLIAM T. WILBUR
BY
Barnes, Kisselle, Raisch & Choate
ATTORNEYS

United States Patent Office 3,523,172
Patented Aug. 4, 1970

3,523,172
WELDING APPARATUS
William T. Wilbur, New Baltimore, Mich., assignor to Progressive Welder & Machine Company, Pontiac, Mich., a corporation of Michigan
Filed Dec. 19, 1966, Ser. No. 602,680
Int. Cl. B23k 9/28, 11/10
U.S. Cl. 219—89
23 Claims

ABSTRACT OF THE DISCLOSURE

The welding apparatus described herein comprises a pair of arms telescoped within one another and connected to one another at one end. An electrode is supported on the other end of one of said arms and is guided by the other end of the other of said arms. A second electrode is mounted adjacent and movable toward the first electrode. In one form of the invention disclosed herein, the arms are U-shaped and the second electrode is mounted on the cylinder of a fluid motor while the piston is fixed adjacent the one ends of said pair of arms. Means are provided for retracting and returning the second electrode to permit the workpiece to be moved into and out of welding position. In another form of the invention disclosed herein, the welding electrode is mounted on another pair of arms in a similar fashion to the first pair of arms and similar means are provided for moving the electrode towards one another to apply welding pressure.

---

This invention relates to welding apparatus and particularly to an apparatus which is capable of welding titanium and similar metals.

BACKGROUND OF THE INVENTION

In the welding of titanium and similar metals, high pressures are required and it is necessary to provide a rapid movement of the electrodes towards one another after the initial melting of the metal to produce a forging action. The problems of producing such an apparatus are made more difficult where the apparatus must necessarily be portable and must be large enough to receive workpieces of relatively large size such as are found in aircraft frames.

In such welding apparatus, it has been found that there have been tendencies for movements of the electrodes which are commonly referred to as electrode skid and electrode roll. Electrode skid is the tendency of the electrodes to move laterally out of axial alignment. Electrode roll is the tendency of the electrodes to roll relative to one another on the workpiece and thereby move out of axial alignment.

Among the objects of the invention are to provide a welding apparatus which is portable, wherein high welding pressures can be readily achieved, wherein rapid movement of the electrodes toward one another, known as follow-up, after initial melting of the metal is achieved, and wherein electrode skid and roll are eliminated or minimized.

SUMMARY

The welding apparatus embodying the invention comprises a pair of arms telescoped within one another and connected to one another at one end. An electrode is supported on the other end of one of said arms and is guided by the other end of the other of said arms. A second electrode is mounted adjacent and movable toward the first electrode. In one form of the invention disclosed herein, the arms are U-shaped and the second electrode is mounted on the cylinder of a fluid motor while the piston is fixed adjacent the one ends of said pair of arms. Means are provided for retracting and returning the second electrode to permit the workpiece to be moved into and out of welding position. In another form of the invention disclosed herein, the welding electrode is mounted on another pair of arms in a similar fashion to the first pair of arms and similar means are provided for moving the electrode towards one another to apply welding pressure.

DESCRIPTION

The welding apparatus embodying the invention is adapted to weld titanium and other similar metals and particularly workpieces which are of various configurations and require the use of a portable welding apparatus.

Figures 1, 2, 3:
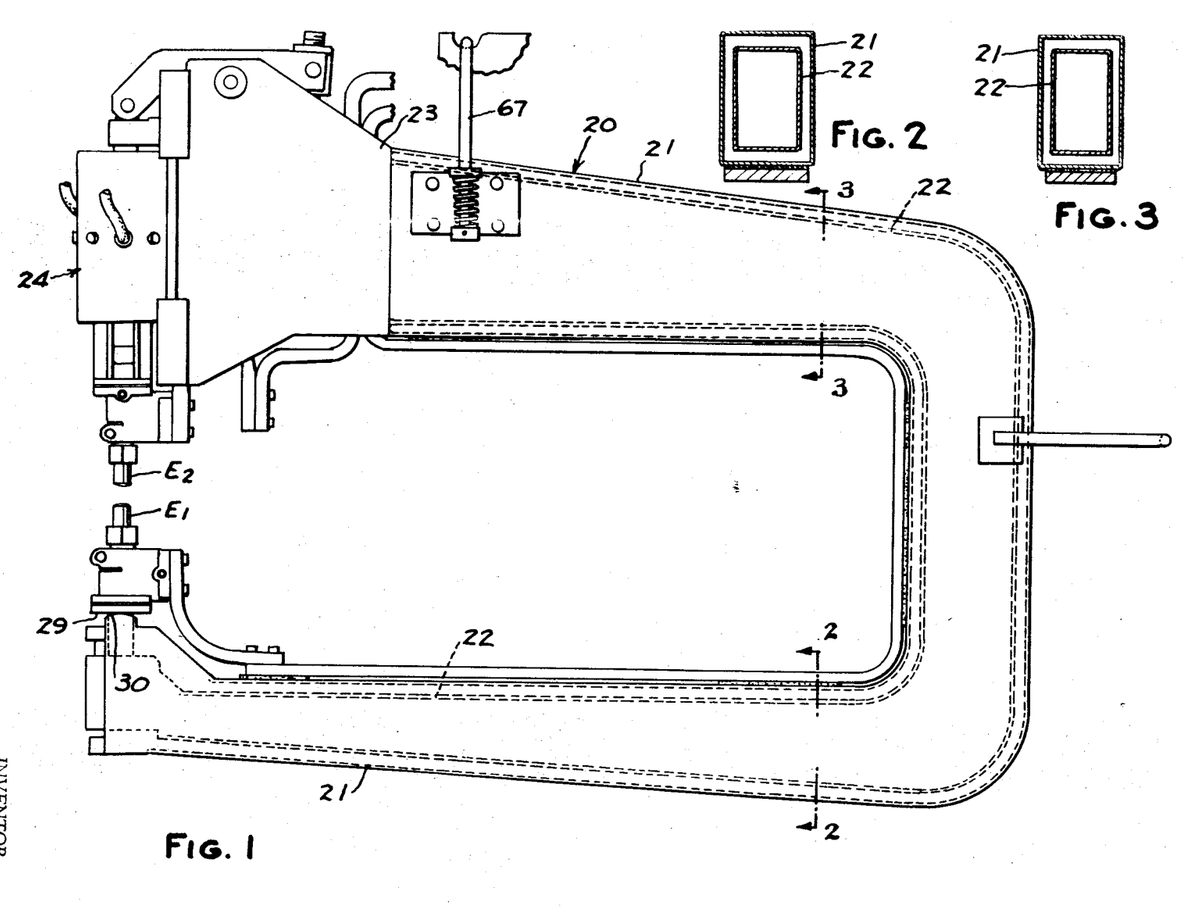
FIG. 1 is a side elevational view of a welding apparatus embodying the invention.
FIG. 2 is a sectional view taken along the line 2—2 in FIG. 1.
FIG. 3 is a sectional view taken along the line 3—3 in FIG. 1.

As shown in FIG. 1, the welding apparatus 20 comprises a pair of arms 21, 22 which are generally U-shaped and tubular and rectangular in cross section. Second arm 22 is telescoped within the first arm 21 and the arms 21, 22 are connected at one end to a frame 23.

Figure 4:
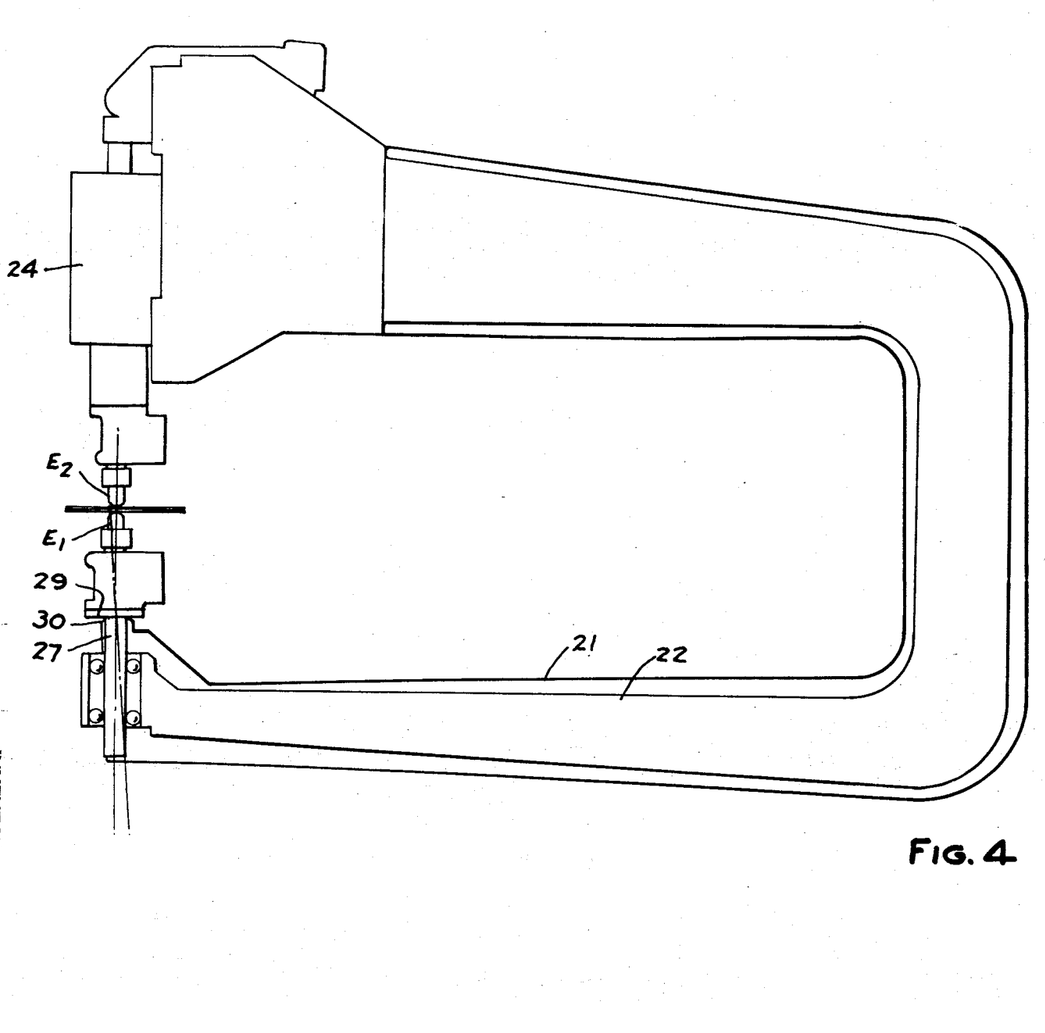
FIG. 4 is a partly diagrammatic view of the welding apparatus shown in FIG. 1.

As shown diagrammatically in FIG. 4, a first electrode $E_1$ is mounted on the other end of the first arm 21 and is guided axially by the other end of arm 22. A second electrode $E_2$ is adapted to be moved toward and away from the first electrode by a pneumatic motor 24, as presently described.

Figures 6, 7:
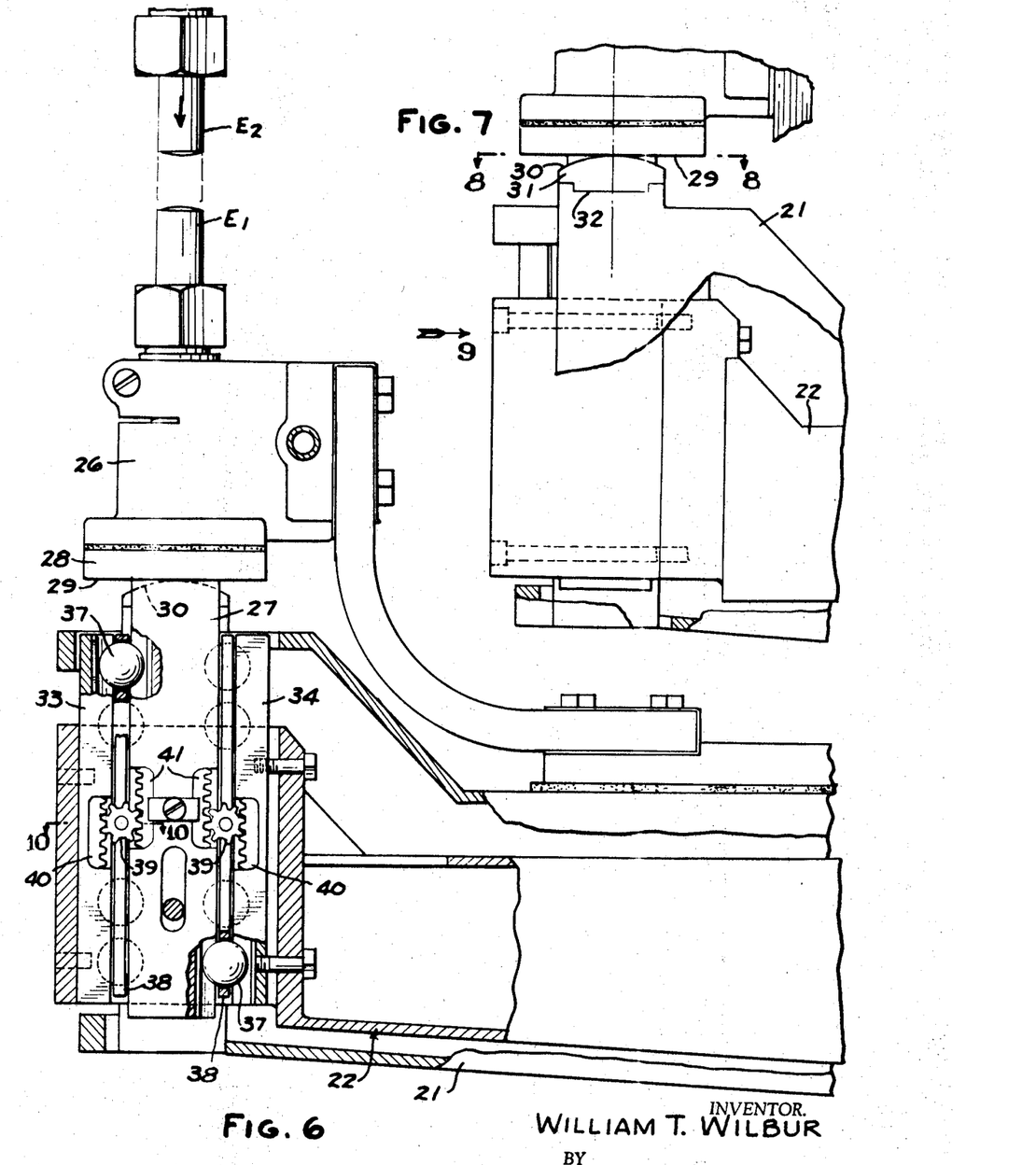
FIG. 6 is a part sectional view on an enlarged scale of another portion of the application shown in FIG. 1.
FIG. 7 is a fragmentary view of the portion of the apparatus shown in FIG. 6.

Referring to FIGS. 6 and 7, first electrode $E_1$ is fixed in an adapter 25 that, in turn, is clamped in an electrode holder 26. Electrode holder 26 includes a downwardly extending shaft 27 and a laterally extending pad 28. Pad 28 includes a flat undersurface 29 that engages arcuate contacting surfaces 30 on the first arm 21. In this fashion, the total load on the electrode $E_1$ is transferred through the surfaces 29, 30 to the first arm 21. As shown in FIG. 7, the surface 30 forms a part of a pad 31 that is removably mounted on the arm 21 and has interengaging surfaces 32. Shims (not shown) can be provided under one or both of the pads 30 to properly align the electrode $E_1$ and thereby eliminate electrode skid and roll. The provision of the curved surfaces 30 substantially eliminates electrode roll.

Figures 8, 9, 10:
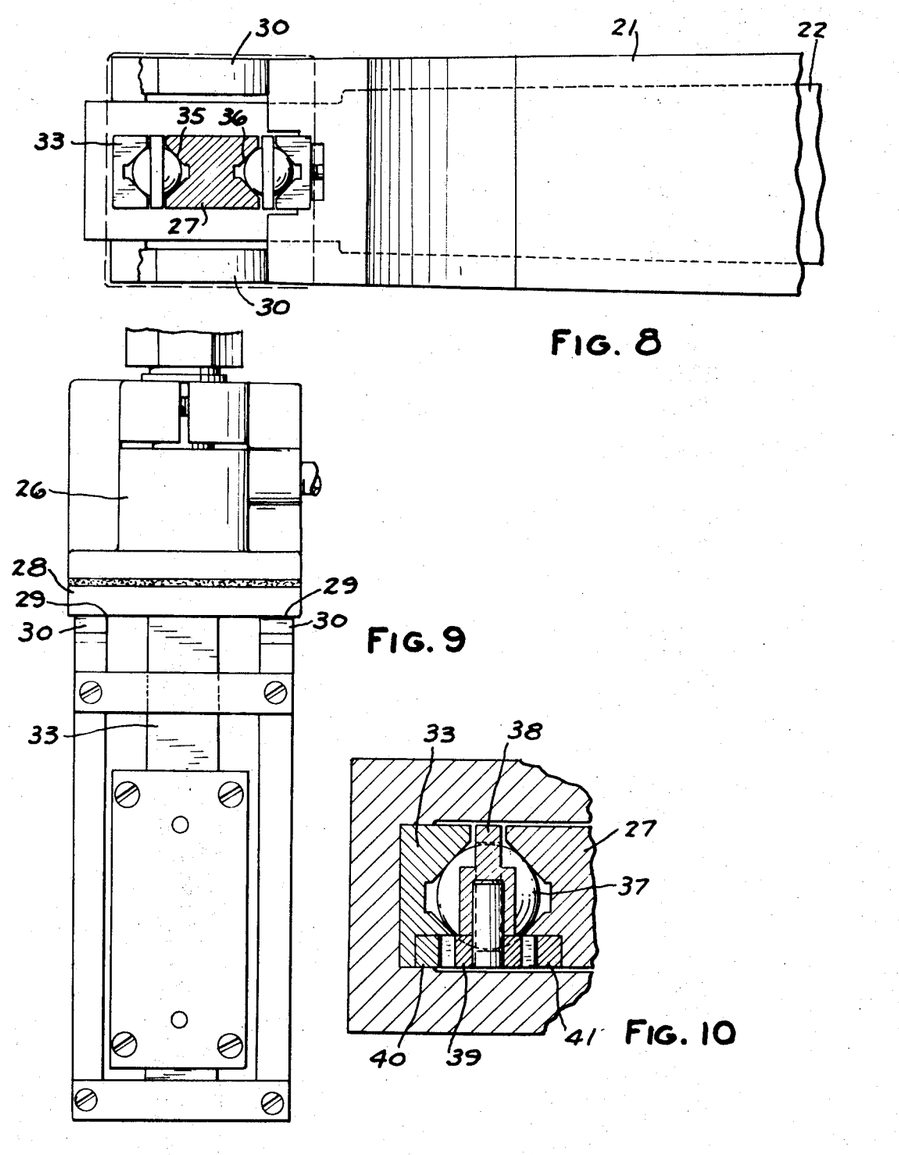
FIG. 8 is a fragmentary sectional view taken along the line 8—8 in FIG. 7.
FIG. 9 is a fragmentary view taken in the direction of the arrow 9 in FIG. 7.
FIG. 10 is a fragmentary sectional view taken along the line 10—10 in FIG. 6.

Referring to FIGS. 6, 8 and 10, the shaft 27 is guided by anti-friction means in the inner arm 22. Specifically, bearing races 33, 34 are mounted on the arm 22 and races 35, 36 are provided on the shaft 27. Balls 37 are provided in the races and are guided by cage members 38. In order to maintain the cage members in position and prevent their becoming displaced, interengaging gear and rack means can be provided as shown. Specifically, gears 39 are journalled on the cage members 38 and engage racks 40 on the races 33, 34 and racks 41 on the shaft so that the cage members 38 are translated when the shaft 37 moves a distance equal to one-half the distance of movement of the shaft.

By the above-described arrangement, the entire load on the electrode $E_1$ is absorbed by the arm 21 while the arm 22 functions to guide the electrode $E_1$.

Figure 5:
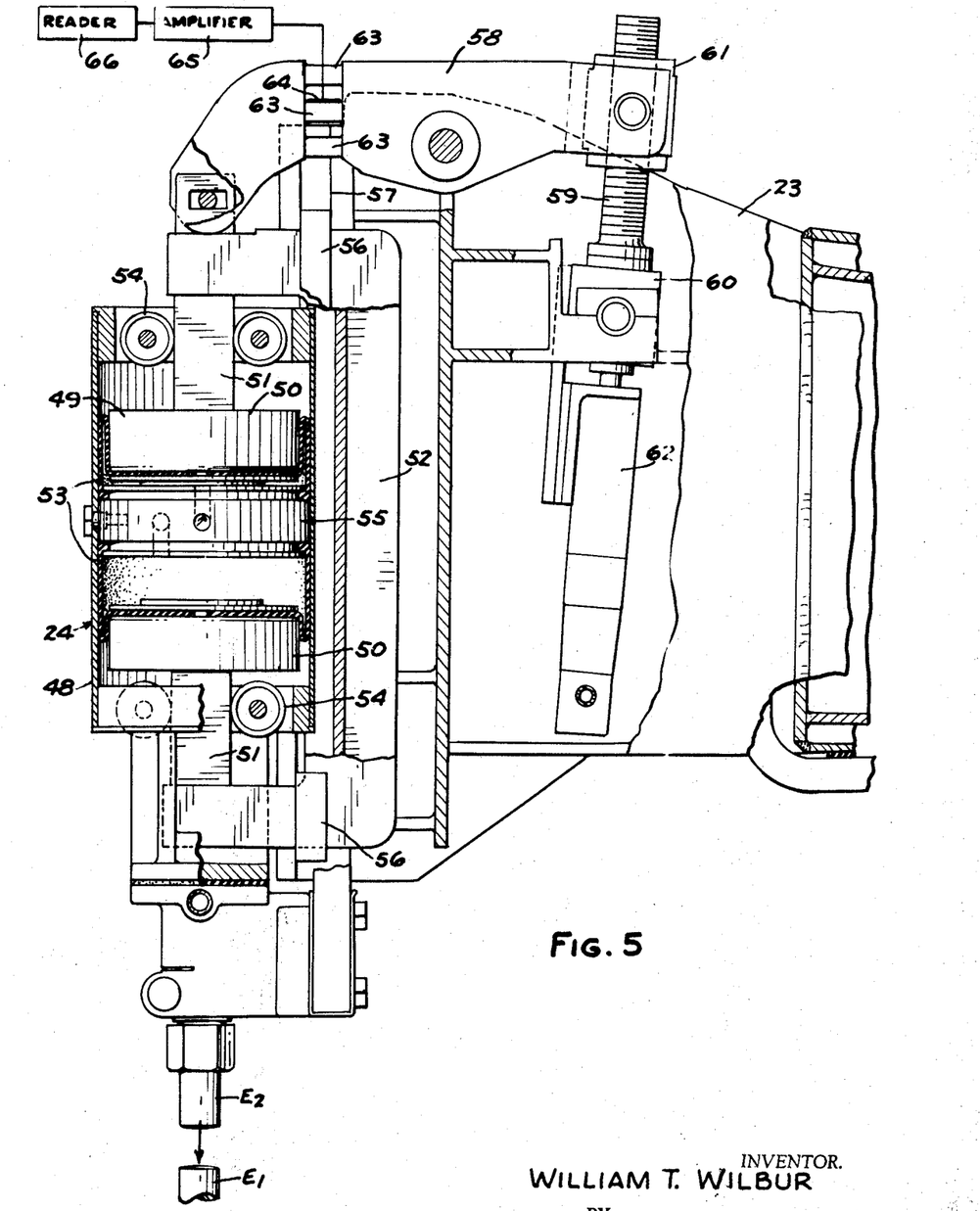
FIG. 5 is a partly sectional view on an enlarged scale of a portion of the apparatus shown in FIG. 1.

Referring to FIG. 5, the second electrode $E_2$ is mounted in an adapter 45 which is clamped in a holder 46 that, in turn, is connected by a support 47 to the cylinder 48 of fluid motor 24. Fluid motor 24 is of the diaphragm seal type and includes a piston 49 made of two spaced sections 50 that have shaft extensions 51 fixed on a yoke 52. Diaphragm seals 53 are provided between the pistons and the cylinders. The shaft extensions 51 are square in cross section. Rollers 54 on the cylinders engage the surfaces of the shaft extensions 51 to guide the cylinder 48 relative to the piston and, in turn, prevent any rotation of the second electrode $E_2$. The cylinder 48 is divided into two sections by a member 55. By applying fluid above and below the member 55, the electrode $E_2$ is moved toward and away from the electrode $E_1$.

By the arrangement shown, by simultaneously applying fluid above and below the member 55 and suddenly reducing the fluid below the member 55, a rapid follow-up of electrode $E_2$ occurs that produces a forging action which is desired in the welding of metals such as titanium.

In order to retract the electrode $E_2$ and permit insertion of a workpiece and removal of a workpiece, the yoke 52 is provided with guide blocks 56 that engage a guideway 57 in the frame 23. A lever 58 is provided at one end to the upper shaft extension 51 and at its other end is connected to a mechanism which includes a threaded shaft 59 which is journalled to a pivot block 60 and is threaded into a nut 61 on the end of lever 58. A rotary air motor 62 is connected to the shaft 59. Energization of the air motor 62 rotates the shaft 59 to pivot the lever 58 and thereby move the yoke 52 toward and away from the electrode $E_1$. This, in turn, moves the electrode $E_2$ toward and away from the electrode $E_1$.

As shown in FIG. 5, the lever 58 includes integral portions 63 on which a wire strain gauge 64 is mounted. The strain gauge is, in turn, connected to an amplifier 65 and a recorder 66 to record the strain on the lever 58 which is directly proportional to the pressure of the electrodes $E_1$, $E_2$, thereby producing a direct readoff of welding pressure.

The electrodes are supplied with electrical current in accordance with conventional practice and, although portions of the connections are shown in the drawings, they are not described herein.

In use, the air motor 62 is actuated to retract the piston 49 and cylinder 48 of the motor 24 to move the electrode $E_2$ out of the way and permit the insertion of the workpiece. The air motor 62 is again actuated to bring the electrode $E_2$ into position adjacent the electrode $E_1$. Fluid preferably air, is introduced to cause the cylinder 48 to move downwardly to bring the electrode $E_2$ into position permitting the energization of the electrode for welding. In the welding of titanium and similar metals, some fluid pressure is preferably maintained intially below the member 55 so that after the metal is initially heated, the pressure beneath the member 55 can be suddenly relieved to permit the pressure above the member 55 to quickly move the electrode $E_2$ downwardly and provide a forging action. After the weld is completed, air motor 62 is again energized to retract the electrode $E_2$ and thereby permit removal of the workpiece.

During the forging action, the stress initially placed upon the arm 21 produces a spring force that assists the forging action which is required to complete the weld.

In the form of the invention shown in FIGS. 11–16, the electrodes are each supported by a pair of arms, one of the arms carrying the entire load of welding pressure while the other of the arms guides the electrodes. Specifically, two pairs of arms are journalled on a shaft 70. One pair of arms comprises arms 71, 72 that are telescoped within one another. The arm 71 supports the electrode $E_1$ while the arm 72 guides the elecrode in the manner of the previously described form of the invention. The second pair of arms comprises arms 73, 74 which are telescoped within one another and support the electrode $E_2$ with the outer arm 73 carrying the pressure on the electrode while the inner arm 74 guides the electrode as in the previous form of the invention. The ends of the arms 73, 74 adjacent the shaft 75 are fixed to one another. Extensions 75, 76 extend from the connections of the pairs of arms. Extension 76 is connected to the cylinder 77 of the pneumatic motor while extension 75 is connected to the piston 78 through a lever 79. The lever 79 is adapted to be rapidly pivoted by a threaded shaft 80, nut 81 and a rotary air motor 82 as in the previous form of the invention to provide for retraction of the electrodes for insertion and removal of the workpiece.

Figures 11, 12:
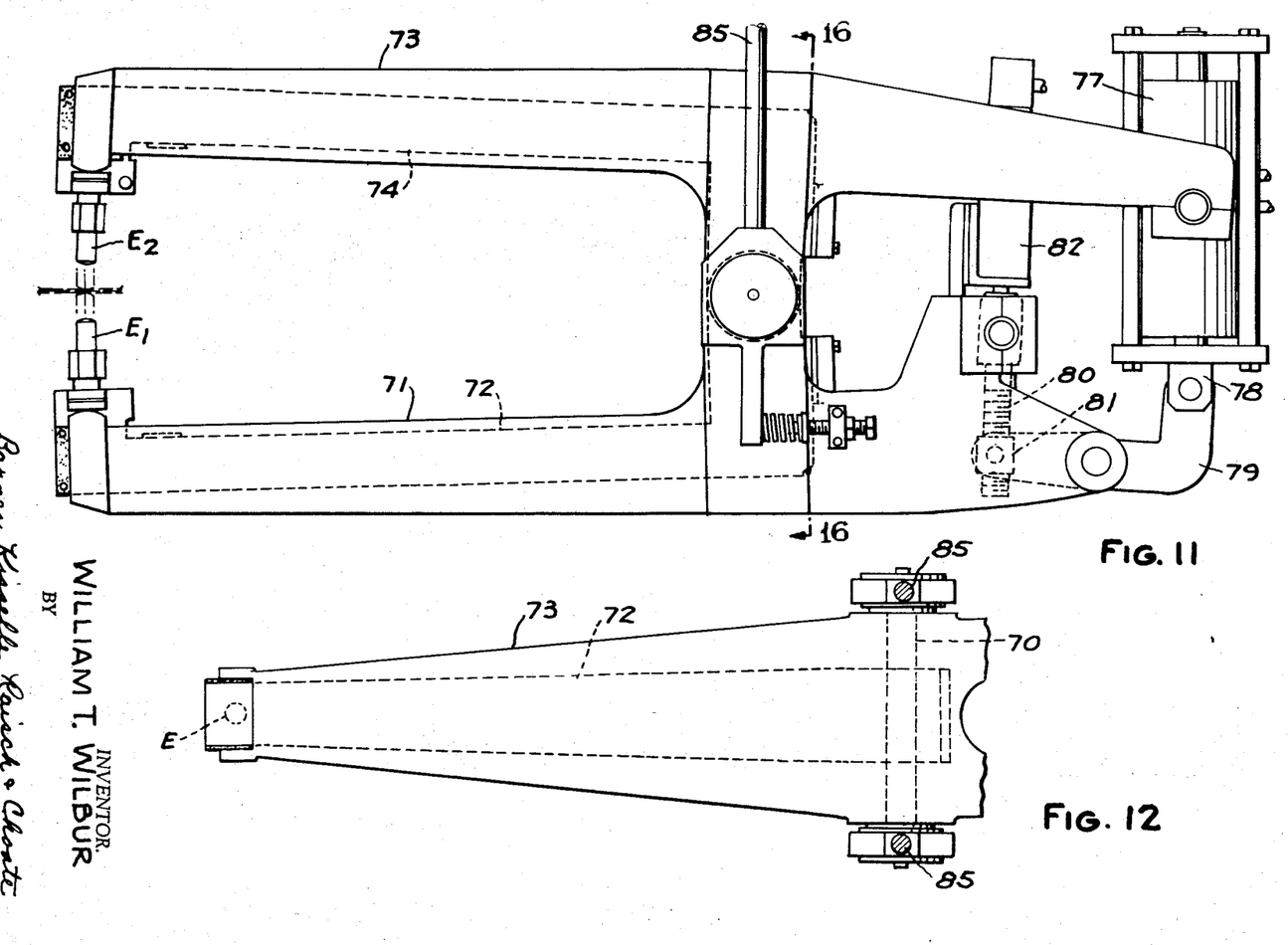
FIG. 11 is a side elevational view of a modified form of welding apparatus.
FIG. 12 is a fragmentary plan view of a portion of the apparatus shown in FIG. 11.
Figures 13, 14, 15:
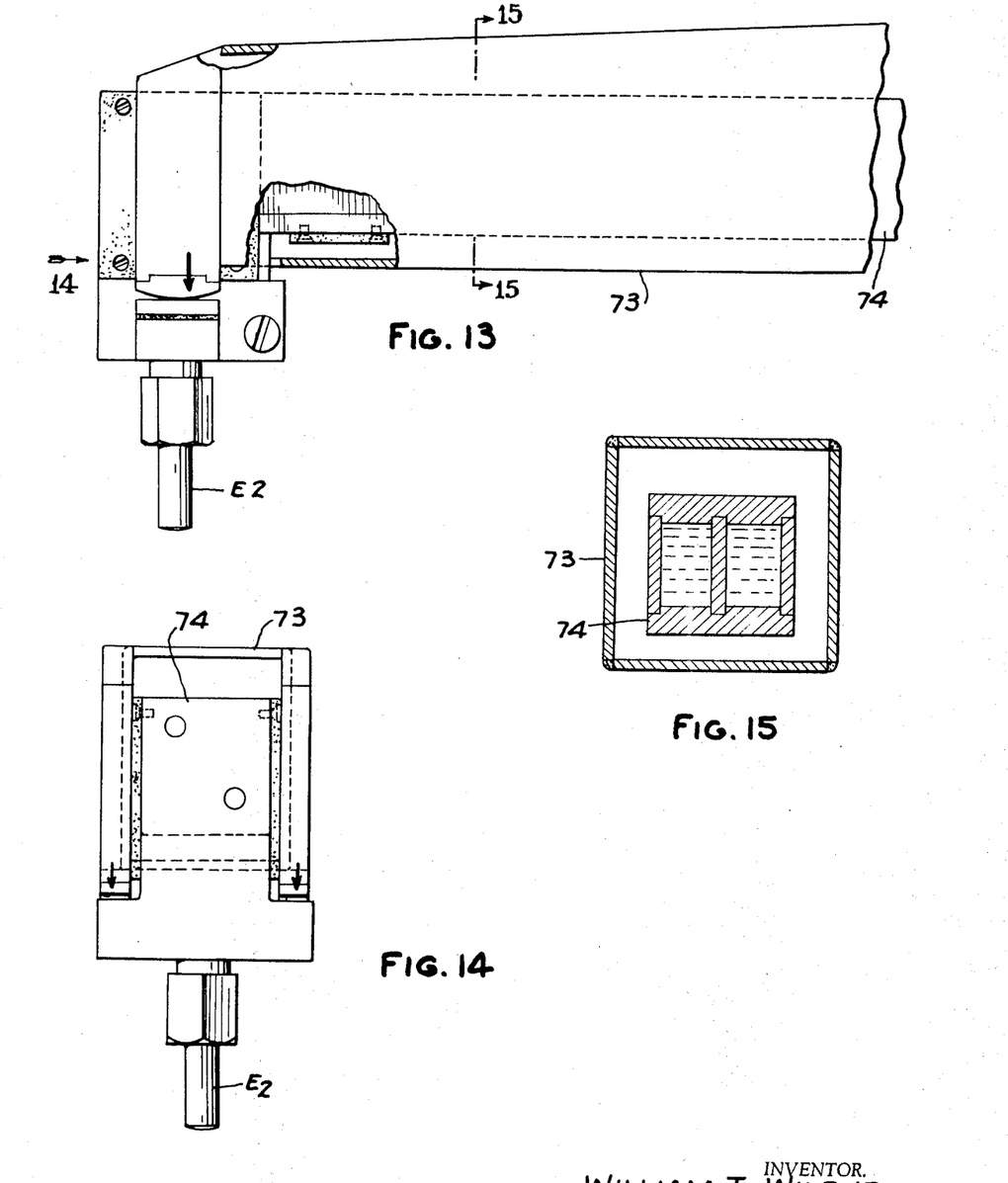
FIG. 13 is a fragmentary part sectional side elevational view of a portion of the apparatus shown in FIG. 11.
FIG. 14 is a view taken in the direction of the arrow in FIG. 13.
FIG. 15 is a sectional view taken along the line 15—15 in FIG. 13.
Figure 16:
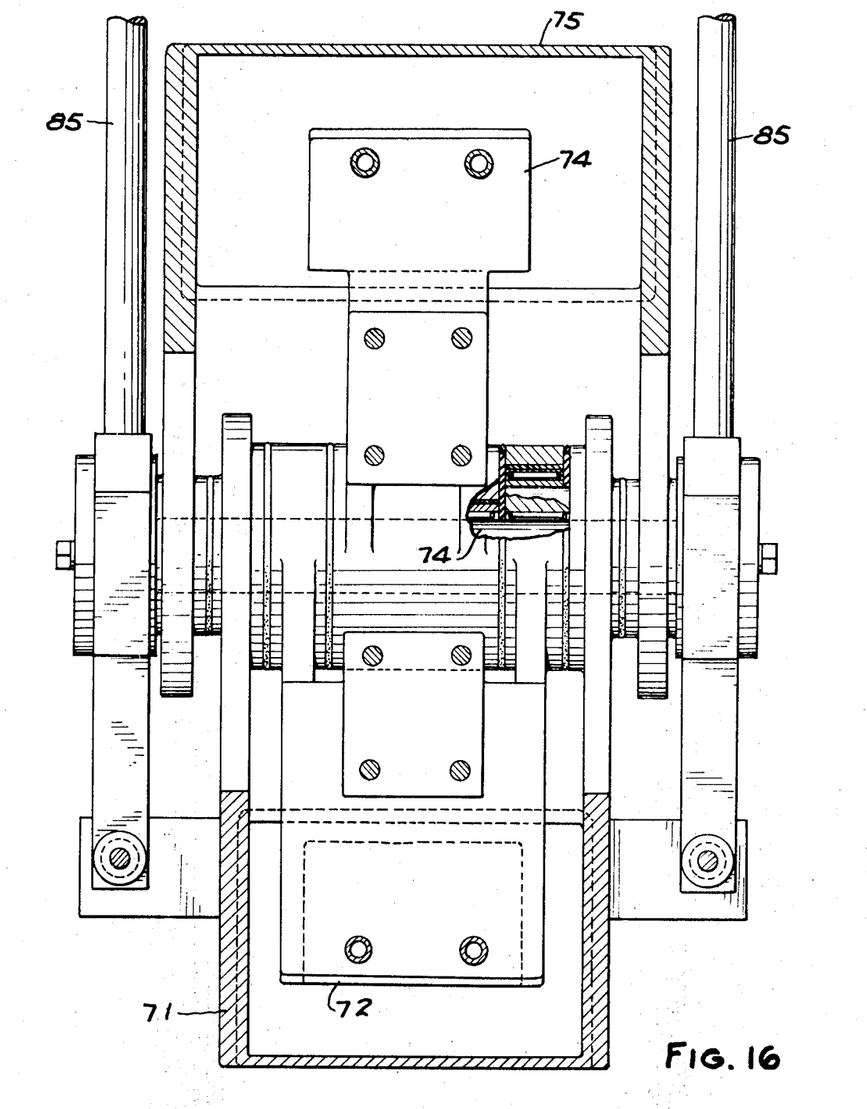
FIG. 16 is a sectional view taken along the line 16—16 in FIG. 11.

As in the previous form of the invention, the energization of the motors 82, 77 occurs successively to insert the workpiece and operate on the workpiece.

It has been found that the apparatus embodying the invention permits the application of a high welding pressure on the order of as much as 6000 pounds electrode force. On the other hand, the welding pressure can be varied as desired to as little as required, for example, on the order of 250 pounds electrode force. The arrangement provides for minimum weight in the actuating mechanism so that a rapid follow-up or forging action can be readily achieved. The entire assembly can be readily supported as, for example, by the hanger 67 (FIG. 1) or the hanger 85 (FIG. 11).

I claim:
1. In a welding assembly, the combination comprising:
   a first tubular arm,
   a second arm extending within and being surrounded by said first arm,
   means for connecting one end of said first arm to one end of said second arm,
   holder means for supporting a first electrode on the other end of said first arm for movement relative thereto,
   means on the other end of said second arm for guiding said first electrode comprising anti-friction means on said second arm and engaging a portion of said holder,
   means for mounting a second electrode adjacent said first electrode,
   means for moving said second electrode toward and away from said first electrode.
2. The combination set forth in claim 1 wherein said first arm includes an upwardly curved portion engaged by said electrode holder.
3. The combination set forth in claim 1 wherein:
   said means for mounting a second electrode adjacent said first electrode comprising a fluid motor comprising a cylinder,
   means for mounting said second electrode on said cylinder,
   a piston within said cylinder,
   and means for supporting said piston in relatively fixed relation to said one end of said first and second arms.
4. The combination set forth in claim 3 including means for moving said piston relative to said arms to thereby move said second electrode away from and toward the first electrode to provide a retracting and return motion.

5. The combination set forth in claim 4 including a yoke fixed to opposite ends of said piston,
and means for guiding said yoke.

6. The combination set forth in claim 4 wherein said means for moving said piston comprises a lever pivoted intermediate its ends and connected at one end to said piston,
and a motor connected to the other end of said lever.

7. The combination set forth in claim 6 including strain gauge means on said lever,
and means responsive to said strain gauge means for indicating the stress and thereby the pressure on said electrodes.

8. The combination set forth in claim 6 wherein said means for moving said lever comprises a rotory motor,
a threaded shaft operated by said motor,
and a nut on said lever into which said shaft is threaded whereby rotation of said shaft pivots said lever.

9. The combination set forth in claim 3 wherein said piston includes shaft extensions,
said extensions being non-circular in cross section,
said cylinder having rollers thereon engaging said shaft extensions.

10. The combination set forth in claim 9 wherein said shaft extensions are rectangular in cross section,
said rollers engaging the sides of said shaft extensions.

11. In a welding assembly, the combination comprising:
a first arm,
a second arm,
each of said arms being generally U-shaped,
means for connecting one end of said first arm to one end of said second arm,
holder means for supporting a first electrode on the other end of said first arm for movement relative thereto,
means on the other end of said second arm for guiding said first electrode comprising anti-friction means on said second arm and engaging a portion of said holder,
said first arm being tubular and said second arm extending within and being surrounded by said first arm,
and a second electrode,
means for supporting said second electrode on one end of said first arm comprising:
a fluid for moving said second electrode towards said first electrode.

12. The combination set forth in claim 11 wherein said holder includes upwardly curved portions engaged by said electrode holder.

13. The combination set forth in claim 11 wherein said fluid motor for supporting a second electrode adjacent said first electrode comprises a cylinder:
means for mounting said second electrode on said cylinder,
a piston within said cylinder,
and means for supporting said piston in relatively fixed relation to said one ends of said first and second arms.

14. The combination set forth in claim 13 including means for moving said piston relative to said arms to thereby move said second electrode away from and toward the first electrode to provide a retracting and return motion.

15. The combination set forth in claim 14 including a yoke fixed to opposite ends of said piston,
and means for guiding said yoke.

16. The combination set forth in claim 14 wherein said means for moving said piston comprises a lever pivoted intermediate its ends and connected at one end to said piston:
and a motor connected to the other end of said lever.

17. The combination set forth in claim 16 including strain gauge means on said lever:
and means responsive to said strain gauge means for indicating the stress and thereby the pressure on said electrodes.

18. The combination set forth in claim 16 wherein said means for moving said lever comprises a rotary motor:
a threaded shaft operated by said motor,
and a nut on said lever into which said shaft is threaded whereby rotation of said shaft pivots said lever.

19. The combination set forth in claim 13 wherein said piston includes shaft extensions:
said extensions being non-circular in cross section,
said cylinder having rollers thereon engaging said shaft extensions.

20. The combination set forth in claim 19 wherein said shaft extensions are rectangular in cross section,
said rollers engaging the sides of said shaft extensions.

21. In a welding assembly, the combination comprising:
a first arm,
a second arm,
means for connecting one end of said first arm to one end of said second arm,
holder means for supporting a first electrode on the other end of said first arm for movement relative thereto,
means on the other end of said second arm for guiding said first electrode,
a second electrode,
a third arm,
a fourth arm,
means for connecting one end of said third arm to one end of said fourth arm and pivoting said one ends of said third and fourth arms to said one ends of said first and second arms,
holder means on said third arm for supporting said second electrode for movement relative thereto,
and means on said fourth arm for guiding said second electrode comprising anti-friction means on said respective arm engaging a portion of said last mentioned holder.

22. The combination set forth in claim 21 including means for moving said first holder towards said second holder comprising a fluid motor comprising a cylinder fixed to said one ends of said third and fourth arms:
and a piston connected to said one ends of said first and second arms.

23. The combination set forth in claim 22 including means for moving one pair of arms quickly away from the other pair of arms and operable between said first and second arms and said pistons.

References Cited

UNITED STATES PATENTS

| | | | |
|---|---|---|---|
| 1,750,757 | 3/1930 | Johnson | 219—89 |
| 2,013,585 | 9/1935 | Sciaky | 219—89 |
| 2,037,040 | 4/1936 | Paugh | 219—89 |
| 2,689,295 | 9/1954 | Goldner | 219—89 |
| 2,810,062 | 10/1957 | Kaunitz | 219—89 |
| 2,879,373 | 3/1959 | Fagge | 219—89 |
| 3,136,879 | 6/1964 | Waltonen | 219—89 |
| 3,277,698 | 10/1966 | Mason | 338—2 |
| 3,320,400 | 5/1967 | Leathers | 219—89 |
| 3,396,260 | 8/1968 | Waltonen | 219—89 |
| 3,396,261 | 8/1968 | Kirsch | 219—89 |

W. DEXTER BROOKS, Primary Examiner

U.S. Cl. X.R.

219—86